(12) United States Patent
Wobben

(10) Patent No.: US 7,541,757 B2
(45) Date of Patent: Jun. 2, 2009

(54) MOTOR VEHICLE

(76) Inventor: Aloys Wobben, Argestrasse 19, Aurich (DE) 26607

( * ) Notice: Subject to any disclaimer, the term of this patent is extended or adjusted under 35 U.S.C. 154(b) by 0 days.

(21) Appl. No.: 11/868,247

(22) Filed: Oct. 5, 2007

(65) Prior Publication Data

US 2008/0079374 A1    Apr. 3, 2008

Related U.S. Application Data

(63) Continuation of application No. 10/562,548, filed as application No. PCT/EP2004/003151 on Mar. 25, 2004, now Pat. No. 7,309,966.

(30) Foreign Application Priority Data

Jul. 9, 2003    (DE) ................. 103 31 084

(51) Int. Cl.
*H02J 7/00* (2006.01)
(52) U.S. Cl. ............. 318/139; 320/124; 320/127; 320/132; 320/133; 320/136; 320/137; 180/65.1; 180/65.8; 702/63
(58) Field of Classification Search ............. 318/139; 320/124, 127, 132, 133, 136, 137; 180/65.1, 180/65.8; 702/63
See application file for complete search history.

(56) References Cited

U.S. PATENT DOCUMENTS

| | | | |
|---|---|---|---|
| 3,904,947 A | 9/1975 | Crews | |
| 4,218,644 A | 8/1980 | Bourke et al. | |
| 4,313,080 A | 1/1982 | Park | |
| 5,150,045 A | 9/1992 | Nagano et al. | |
| 5,397,991 A | 3/1995 | Rogers | |
| 5,486,750 A | 1/1996 | Walborn et al. | |
| 5,642,270 A * | 6/1997 | Green et al. | 363/17 |
| 5,656,916 A * | 8/1997 | Hotta | 320/160 |
| 5,767,584 A | 6/1998 | Gore et al. | |
| 5,929,595 A | 7/1999 | Lyons et al. | |
| 5,939,861 A | 8/1999 | Joko et al. | |
| 6,107,691 A | 8/2000 | Gore et al. | |
| 6,127,798 A * | 10/2000 | Lansang et al. | 320/104 |
| 6,232,743 B1 | 5/2001 | Nakanishi | |
| 6,417,762 B1 | 7/2002 | Comer | |
| 6,633,165 B2 * | 10/2003 | Bertness | 324/426 |
| 6,649,289 B2 | 11/2003 | Hsu et al. | |
| 2003/0059654 A1 | 3/2003 | Hsu et al. | |

(Continued)

FOREIGN PATENT DOCUMENTS

DE    4337978 A1    6/1994

(Continued)

OTHER PUBLICATIONS

Bojrup, M., et al., "A Dual Purpose Battery Charger for Electric Vehicles", IEEE 1998, pp. 565-570.

*Primary Examiner*—Rita Leykin
(74) *Attorney, Agent, or Firm*—Seed IP Law Group PLLC

(57) ABSTRACT

A system and method for operating an electrical supply network are disclosed. An exemplary embodiment couples a vehicle to the supply network, receives a trigger to cause a partial discharge of an electrical energy storage device of the vehicle into electric power network, and discharges electrical energy into the electric power network from the vehicle in response to receiving the trigger.

15 Claims, 3 Drawing Sheets

U.S. PATENT DOCUMENTS

2005/0127855 A1 * 6/2005 Wobben .................. 318/139

FOREIGN PATENT DOCUMENTS

| DE | 197 22 644 C1 | 9/1998 |
|---|---|---|
| JP | 10271694 A | 10/1998 |
| JP | 2001258177 A | 9/2001 |
| JP | 2002315193 A | 10/2002 |
| WO | 9302887 A1 | 2/1993 |
| WO | 02/074573 A2 | 9/2002 |

* cited by examiner

MOTOR VEHICLE

CROSS-REFERENCE TO RELATED APPLICATION

This application is a continuation of and claims priority to copending nonprovisional utility application entitled, "MOTOR VEHICLE," having Ser. No. 10/562,548, filed May 16, 2006, which is the U.S. National Phase of PCT/EP04/003151 filed Mar. 25, 2004, which claims priority to Application No. DE 103 31 084.3 filed Jul. 9, 2003, which are incorporated herein by reference in their entirety.

BACKGROUND OF THE INVENTION

1. Field of the Invention

The present invention concerns a motor vehicle comprising at least one electric motor, an energy storage device for providing drive energy for the electric motor, a plug connector connected to the energy storage device for connection to a current source and a control means for controlling the flow of current from the current source to the energy storage device.

2. Description of the Related Art

Vehicles which store electric charge have already been known for some time and are eminently suitable for journeys over short and medium distances. In order to make such a vehicle usable the available energy storage device has to be charged up. When the vehicle has covered a certain distance the storage device has to be charged up again. In that case, a careful driver will re-charge the energy storage device after each journey in order always to have at his disposal the greatest possible range.

As state of the art reference is made generally at this point to the following publications: DE 692 20 228; DE 197 22 644 and P 43 37 978.

As journeys with the electric vehicles—like with all other vehicles—cannot always be exactly planned in advance, it can happen with such a procedure that the energy storage device of the vehicle is to be charged up precisely when the cost of the energy is at its highest, and when in addition the supply network is most heavily loaded, for example during what is referred to as a midday peak.

That is disadvantageous both because of the high price of buying the energy while it is also disadvantageous because of the loading on the supply network which in any case is already highly loaded.

BRIEF SUMMARY OF THE INVENTION

A motor vehicle having an electric charge storage device has a control means that permits a flow of current from the energy storage device to a current source. Namely, in that way, an electrical power network a flow of current can take place from the energy storage device of the motor vehicle back into the network and can thus contribute to covering the peak demand.

In a preferred embodiment of the invention the flow of current from the energy storage device to the current source, that is to say for example into the current network, is controlled in such a way that a predeterminable residual amount of electrical energy is retained in the storage device, by the control means interrupting the flow of current to the network when said predetermined residual charge amount is reached. For that purpose, there is provided a device for detecting the amount of charge in the energy storage device.

In a preferred development of the invention the control means communicates with the network through a communication device so that the draw of energy can be controlled in the optimum fashion from the network, in dependence on the location of the motor vehicle and the available amount of charge.

Particularly preferably the control means is designed in such a way that it includes a clock or is connected to a clock. In that way the control means can operate in such a fashion that charging and discharging operations take place in predeterminable periods of time. It is possible in that way to provide that the energy storage device is preferably charged up at night when on the one hand the loading on the supply network is low and on the other hand the costs of charging it up are low, while discharging preferably takes place at times when relieving the load on the supply network makes sense and the costs of the energy are higher than the costs during the charging procedure. In that way it is also possible to achieve an economic advantage, from the point of view of the operator of the vehicle, besides relieving the load on the supply network.

BRIEF DESCRIPTION OF THE SEVERAL VIEWS OF THE DRAWINGS

An embodiment of the invention is described in greater detail hereinafter with reference to the following figures.

DETAILED DESCRIPTION

Figure 1A:
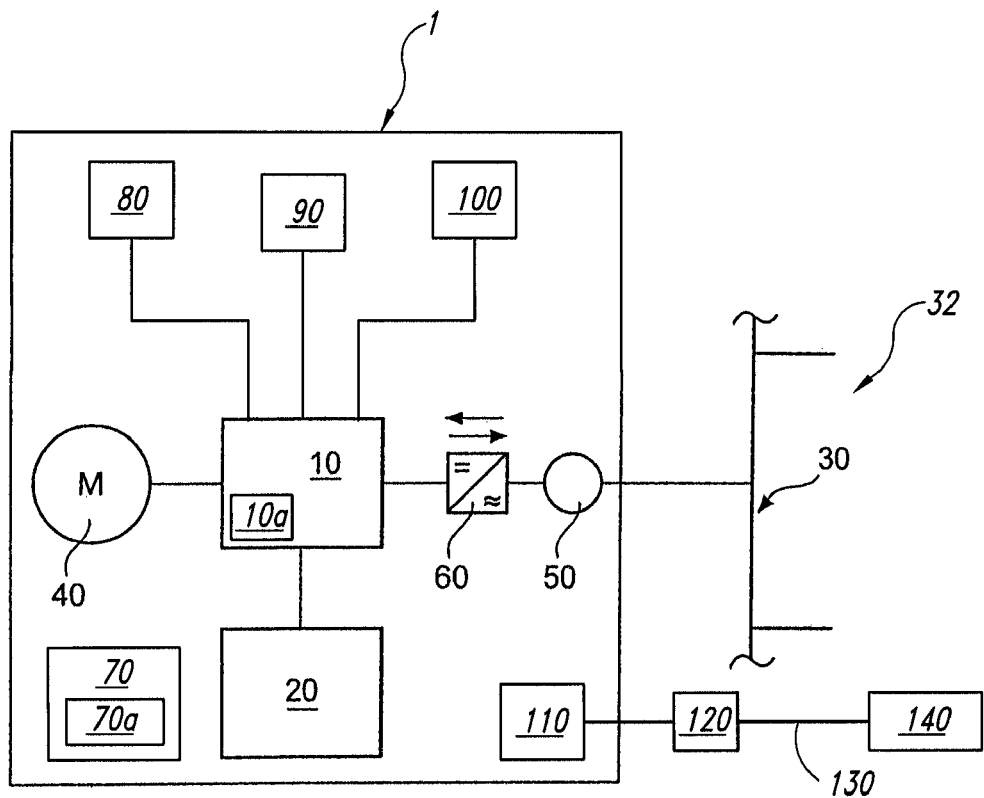
FIG. 1A is a block diagram of a first embodiment of the invention.
Figure 1B:
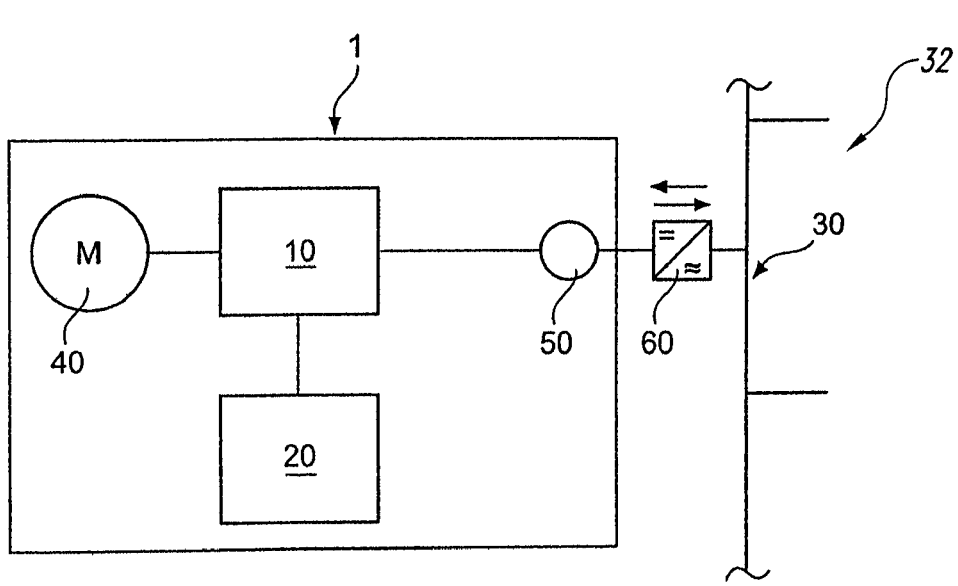
FIG. 1B is a block diagram of an alternative embodiment of the invention.

FIGS. 1A and 1B show a simplified block circuit diagram of the arrangement according to the invention. Reference 1 denotes a frame which includes those components which are associated with the motor vehicle. Accordingly the motor vehicle includes a control means 10. The control means 10 is connected to an energy storage device 20, a drive motor 40 and a releasable connector 50 which for example is in the form of a plug connector. There is also a connection between the connector 50 and a current source 30 which here is indicated in the form of one component an electric power network. If the current source 30 is AC power and the storage device is DC power, as is common, an inverter 60 is provided that converts AC power to DC power and vice versa. The term electric power network is to source to be understood in their broadest terms. Any source of power outside of the vehicle itself is considered part of the electric power network. Thus, any source to provide current or to receive current is considered part of the electric power network, whether public or private, large or small.

In order to provide sufficient energy for operation of the motor vehicle 1, the control means 10 monitors the charge condition of the storage device which can be for example a battery, but also can be a capacitor storage device or the like. When the storage means 10 recognizes that charging of the storage device 20 is required, the control means allows a flow of current from the network 30 to the storage device 20 by way of the connector 50 and the storage device is charged up. It will be appreciated that, in that case, the control means 10 will also take account of the corresponding charged status and the charging characteristics of the storage device so that overcharging of the storage device is reliably prevented and that overdepleting of the charge is avoided.

The control means can also permit charging during a predeterminable first period of time. That makes it possible for the storage device 20 to be preferably charged up at night when on the one hand the price of the electric current is low and thus the costs involved in charging the storage device also remain comparatively low while on the other hand the loading on the supply network 30 is not very high. In addition the control means can be so designed that it permits a flow of current from the storage device 20 by way of the plug connector 50 and inverter 60 into the network 30. In that respect the amount of charge which can be delivered can be limited to always maintain a predeterminable residual amount of charge at the storage device 20.

In that way, for example, after a journey to the place of work, with the storage device 20 fully charged, the energy which is still present in the storage device can be fed into the network 30 again if the demand is particularly high, for example for the midday peak. However the control means interrupts the flow of current from the storage device 20 into the network 30 only when a predeterminable residual amount of charge remains in the storage device 20, so that at any event an adequate amount of energy in the storage device for the return journey in the evening is guaranteed. In one embodiment, the amount of residual charge left can be programmed by the user to be a custom amount based on the distance they need to drive as minimum. For example, some users may wish to always store 20 km of travel charge, while other users may wish to store 10 km or 60 km of travel charge. The user can selectively program the amount of residual charge that must remain when power is transferred from the motor vehicle to the system, in one embodiment.

It will be appreciated that the current which is fed into the network at the peak time is to be suitably reimbursed so that, besides the aspect of relieving the load on the network, there is also an economic advantage to be achieved.

It was proposed in accordance with the invention that a vehicle with an electrical energy storage device is also to be used as an energy source for a power supply network from which the vehicle possibly draws its energy.

As is known, the power demand during the day is markedly higher than the power demand at night. Thus for example the power demand in a public power supply network rises from a low point, usually between 1 o'clock and 4 o'clock at night, toward a first peak in the morning (morning peak), reaches its highest level (midday peak) around midday, and then decreases in the evening again until it reaches its low level in the middle of the night. As therefore the energy demand at middle of the night is markedly lower than the usual available energy supply and the consumers also take night-time power, it is markedly lower in price than the price for daytime power.

An electrical power supply network then has to be designed in such a way that it has to cover without any problem not only the demand at night, but also the demand at the highest daytime peaks. In regard to the electrical supply utilities, that means that a large number of electrical energy generators must be provided, which reliably guarantee that such a demand is met, even at very high midday peaks (on a cold winter's day).

The invention proposes that an electric vehicle which usually draws its electrical energy from an electrical supply network and which therefore also has suitable connections with a connection to an electrical power supply network need not be charged up with the electrical energy from the power supply network at peak usage times, but if necessary, at a given moment in time, can also feed energy that is not required, into the supply network.

If it is first assumed that the vehicles have to be used by the population working on weekdays, only in the periods between 7 am and 8.30 am and about 4.30 pm and 6.30 pm, such a motor vehicle is in a parking place, without being used, for most of the day. Charging up the energy storage device of the electric vehicle at night at the home of the owner of the vehicle is not a problem and has also already been done. What is new however is the proposal according to the invention that, after the motor vehicle has reached the place of work, it is also connected to an electrical current network in order then to provide the energy which is necessary as required, for the peak power times.

If in that case the motor vehicle has batteries which discharge/charge up very quickly, it is therefore possible, just with a number of 500-1000 units of that nature, to provide a very high level of feed-in power for the network.

The particular advantage for the electrical power supply utility is that it can have recourse to an electrical energy storage device which it has not paid for itself and for the maintenance of which it also does not have to bear responsibility. From the point of view of the user of the vehicle, the advantage of the invention is that, for example at the midday time when therefore he does not in any case require his motor vehicle because he is at his place of work, he virtually rents the storage device, which is still well filled, of his vehicle, to the electrical power supply utility, and can sell the energy contained therein. The consumer can therefore feed the electrical energy from his vehicle into the power supply network at midday and will receive a payment or credit at a comparatively high price, while at night he has to arrange for charging up his vehicle at a low price (night-time current rates).

It will be appreciated that, in accordance with the invention, it is also provided that the electrical storage device of the vehicle does not fall below a given minimum level and, if necessary, the electrical storage device of the vehicle can also be charged up again after the midday peak, more specifically when the demand in the network has decreased again in the afternoon.

It can however also be provided that the user individually adjusts his vehicle in such a way that, in the evening, he has sufficient energy to complete his journey home (minimum content of energy with a sufficient level of certainty of arriving home) so that total charging of the storage device is only effected again during the following night, with the corresponding night-time current.

Therefore, by means of suitable programming, possibly also by way of remote input, such as the user employing his cellular phone, the user of the vehicle can also predetermine the periods or the times within which only discharging of his storage device can take place and/or the amount of discharge permitted.

The invention is suitable in particular in conurbations where there are large parking lots and large multi-storey car parks. The invention seems to be quite particularly suitable for use in multi-storey car parks at airports, in particular those airports which carry holiday traffic, for at such car parks there are often many thousands of private cars which are completely unused for an average of 7-14 days. During that period, a suitable power management system at the corresponding connection of the vehicles, if they are in the form of electric vehicles according to the invention, could be made available to the electrical power supply network which discharges the respective storage devices of the vehicles at peak times and charges the storage devices of the vehicles with electrical energy again at the periods of lower demand.

The invention is described in greater detail hereinafter by means of an embodiment illustrated in the drawing.

The electrical storage device of the vehicle 1 is equipped with a suitable electronic control means (power management system) which makes it possible to trigger and control not only electrical charging but also discharging of the storage device.

In addition the power management system can also be programmed in such a way that discharging is possible only for a quite specific time which is predetermined by the user. For example, it can be provided that discharging and thus a feed of power into the electrical energy supply network is possible only during the time from 10 am to 3 pm, otherwise, when the vehicle is connected to the supply network, the battery is being correspondingly charged.

The power management system can also be programmed in such a way that, when discharging is effected in the period from 7 am to 4 pm, charging does not take place straightaway, but charging occurs only in the night period between 12 midnight and 4 am, that is to say when particularly appropriate night-time current is to be taken from an electrical supply network.

In addition the power management system of the vehicle can be programmed in such a way that basically a minimum amount of charge remains in the storage device, that is to say cannot be fed into the supply network, in order in any case to ensure that the user can properly travel the distance that he wants, in his vehicle, that is to say for example the journey home from his place of work.

It will be appreciated that still further programming modes are possible, so that the power management system can also be set by the user himself, in just any conceivable manner, according to his respective wishes, while if necessary there is the possibility of a feed into the power supply network.

Figure 2:
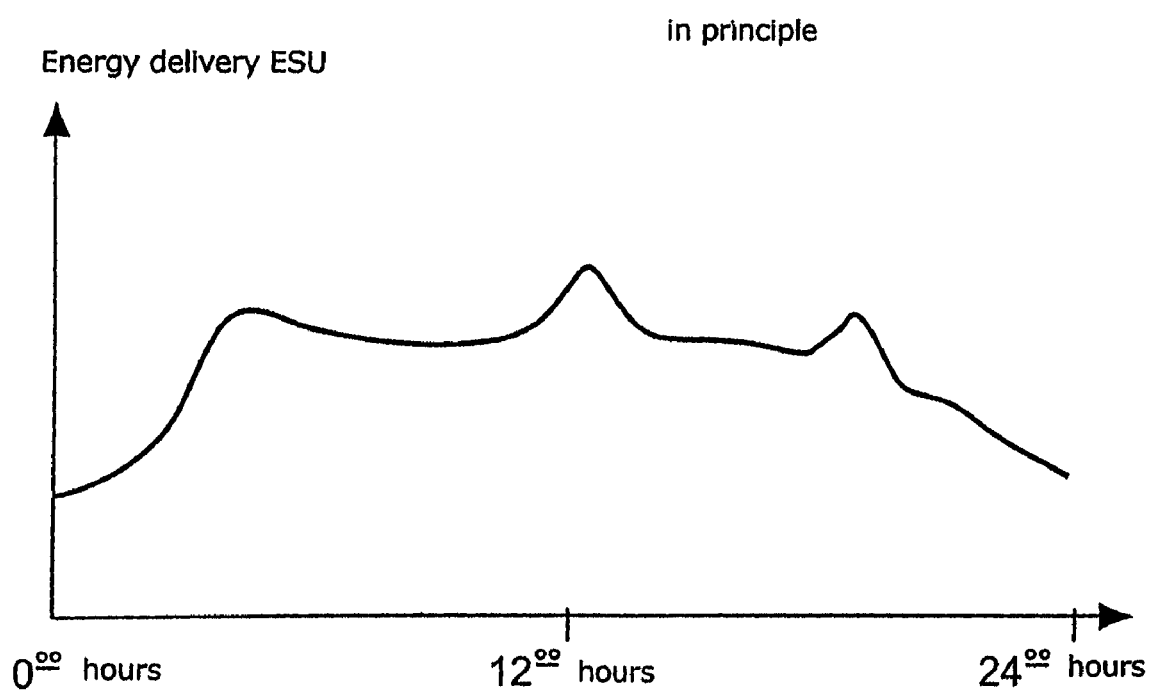
FIG. 2 shows a conventional day chart of the power demand in the case of an electrical power supply utility.

As can be seen from FIG. 2 the current/energy demand of an electrical supply utility (ESU) is not distributed linearly over the entire day, but rises from a lowest point early in the morning (about 1 am to 3 am), reaches a first morning peak, then later reaches the so-called midday peak, that is to say its highest point, and then decreases irregularly towards the night again. The electrical power supply network which has the responsibility of always making sufficient electrical energy available to the consumers connected to the electrical supply network, even at peak times, not only has to ensure that appropriate energy is fed into the supply network, but also that there is always so much energy in readiness that, at all times, that is to say even at extraordinary peak times, the responsibility of providing an electrical supply with electrical energy at a constant voltage level and a constant frequency is always met. It is apparent that a large number of control interventions both on the producer side and also in terms of the distribution of electrical energy is already required nowadays for that purpose.

Figure 3:
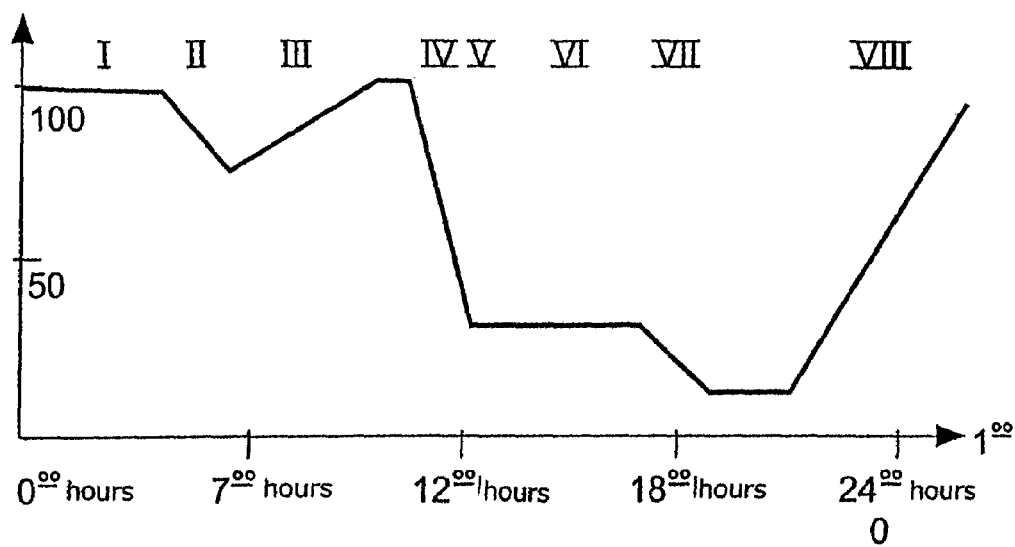
FIG. 3 shows a charge condition time table with the charge condition of a vehicle according to the invention.

FIG. 3 shows a configuration by way of example of the charge condition of the electrical storage device of a vehicle according to the invention. In the electrical storage device which was charged with night-time current during the night, and which therefore exhibits a one hundred percent filling (I), that charge condition falls, in the morning journey (II) to the place of work. When the place of work is reached (III) and the vehicle is connected by way of the electric lines to the electrical supply network, the charge condition is possibly returned to one hundred percent again. At the midday time (IV), that is to say when the midday peak occurs (see FIG. 2), a large part of the stored electrical energy in the storage device is fed into the connected electrical supply network so that the charge condition correspondingly falls within a very short time to a prescribed minimum (V). That minimum has been set by the user or the vehicle manufacturer (it can also be set in another fashion) and should be sufficient for the vehicle to be able to still make the journey home, without charging it up beforehand.

In the illustrated example however the charge condition can also be increased again in the afternoon (VI) by taking energy from the supply network and during the journey home (VII) the charge condition further falls again. When the electric vehicle is subsequently connected to the electrical power supply network the charge condition can be restored to the prescribed value (100%) again in the evening/at night (VIII).

It should be pointed out once again that the configuration as set forth in FIG. 3 is given purely by way of example.

If the electric vehicle has a suitable input surface, the user of the vehicle can execute a large number of setting adjustments.

Thus for example, by means of a suitable input, the user can predetermine the periods of time, within which only discharging of the electrical storage device can take place at all, when connected to an electrical supply network. The user can also set the amount of residual charge below which the battery will not be discharged in order to ensure an adequate amount to travel to a given location.

As corresponding documentation of the charging and discharging operations shows, the user, even after several days, can still see when and what amounts of energy were fed into the electrical supply network.

Besides the electrical storage device, for example a lithium battery or another storage technology, the vehicle according to the invention has a suitable power management program for controlling the charge condition of the electrical storage device and for evaluation of the inputs of the user and also for documentation purposes.

In addition the vehicle can have a suitable data interface (besides receiver/transmitter for wireless (cellular phone) control) so that the vehicle can send to or receive from a suitable interface of the electrical power supply utility, all data which are necessary for charging and also for discharging (feed into the network).

That facilitates documentation of the respective discharging and charging conditions/times and billing thereof. In regard to billing, account is to be taken of the fact that current which is fed into the network at the midday peak can be reimbursed at a better price that night-time current which usually can be made available without any problem and at a better price in relatively large amounts.

Discharging of the storage device with the feed of electrical energy into the power supply network, that this then involves, can also be used for possibly appropriately charging other vehicles with an electrical storage device, the charge condition of which has become too low, to such an extent that those vehicles can still continue to travel.

Therefore the invention also permits a plurality of vehicles to be electrically connected together, with their electrical storage devices.

The present invention also provides that the electric current (electric voltage) of the electrical storage device of the vehicle, for being fed into the current source (network), is converted by an inverter 60 so that the feed into the current source is possible. That inverter can be provided in each vehicle but on the other hand it is also possible for the electric current of the energy storage device to be firstly taken from the vehicle by direct current transmission and for the inverter then to be provided outside the vehicle (as viewed from the vehicle, downstream of the network and the connection of the vehicle) so that the electrical power taken from the vehicle can be produced by an inverter for the feed into the network (for example 50 Hz, network voltage etc).

It is also particularly advantageous that a central inverter station is provided—for the delivery of direct current for the storage device in the vehicle but also for the feed of alternating current into the network—, which for example is provided at garage installations (for example at airports) as here large amounts of electrical energy can occur at such garage installations if a correspondingly large number of vehicles according to the present invention are connected. In that way the costs of the inverters are overall kept at a relatively low level and at the same time it is possible to provide for a methodical feed of alternating current into the electrical network as it is relatively simple to control individual or relatively large inverter stations than many small inverters in vehicles, which ultimately could also result in disturbances, for example harmonics, in the network.

As an inverter also has a degree of efficiency of less than 1, even if it is only slightly below the ideal value of 1, the losses from an inverter in a vehicle (FIG. 1a) are certainly higher than in the case of a stationary, central inverter (FIG. 1b).

In the case of a domestic connection also the inverter can be associated therewith so that an individual vehicle can certainly also feed back energy, at its parking space at home.

As it is certainly the case that working people frequently have to cover reasonable distances and do not use the vehicles throughout the entire working day, there is a statistically demonstrable basic supply of electrical energy which is available for most of the time (working time). If that energy is regularly available those storage devices can also make a contribution to the regulating energy of wind power installations, which is being discussed at present and which is required in the network. That is particularly attractive if the vehicle storage devices are charged from regenerative sources. More specifically then those regenerative energy sources themselves generate and provide at least a part of the regulating energy required.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet, are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A motor vehicle comprising:
   at least one electric motor;
   an electrical energy storage device operable to provide electrical drive energy to the electric motor;
   a plug connector coupled to the energy storage device for connection to an electric power network;
   a controller operable to control a flow of a current from the electric power network to the energy storage device and from the energy storage device to the electric power network;
   a detecting device communicatively coupled to the controller, the detecting device operable to detect an amount of a residual charge in the energy storage device and operable to interrupt the flow of current from the energy storage device to the network when a threshold value of the residual charge is detected; and
   an input coupled to the controller and operable to initiate a partial discharge of the electrical energy stored in the electrical energy storage device to the electric power network in response to an external trigger wherein the plug connector is coupleable to an inverter outside the motor vehicle, and wherein the current of the electrical energy storage device is provided to the inverter.

2. The motor vehicle of claim 1 wherein the external trigger is generated externally from the motor vehicle.

3. The motor vehicle of claim 2 wherein the external trigger is from the electric power network.

4. The motor vehicle of claim 1 wherein the external trigger is from a user input.

5. The motor vehicle of claim 4 wherein the user input is a specified period of time.

6. The motor vehicle of claim 1, further comprising:
   a clock coupled to the input and operable to generate the external trigger in accordance with a period of time.

7. The motor vehicle of claim 6 wherein the period of time is specified by a user.

8. The motor vehicle of claim 1 wherein the threshold value of the residual charge is specified by a user.

9. The motor vehicle of claim 1, wherein the plug connector comprises:
   a ground line operable to connect to a ground line of the electrical supply network, wherein data of the motor vehicle is communicated to a data network of the electrical supply utility via the ground line.

10. A method of operating an electrical supply network, comprising:
    coupling a vehicle to the supply network via a plug connector coupleable to an inverter outside the vehicle;
    controlling a flow of current from the electric power network to an energy storage device;
    receiving an external trigger to cause a partial discharge of power of the electrical energy storage device of the vehicle into electric power network;
    discharging electrical energy into the electric power network from the vehicle in response to receiving the external trigger;

providing the flow of current from the energy storage device to the electric power network during the partial discharge by providing the flow of current to the inverter;

detecting an amount of a remaining residual charge in the energy storage device; and interrupting the flow of a current from the energy storage device to the electric power network when the remaining residual charge amount reaches a threshold value.

11. The method of claim 10 wherein receiving the trigger comprises:

receiving the trigger from a clock operable to generate the trigger based upon a specified time period.

12. The method of claim 10 wherein receiving the trigger from the clock comprises:

receiving a specification of the time period from a user.

13. The method of claim 10 wherein receiving the trigger comprises:

receiving an external trigger from a user.

14. The method of claim 10, further comprising:

coupling a plurality of vehicles to the supply network; and triggering a partial discharge of a plurality of respective electrical energy storage devices of the vehicles.

15. The method of claim 10 wherein the vehicle includes a plurality of electrical energy storage devices, and wherein discharging electrical energy comprises:

discharging electrical energy into the electric power network from the plurality of electrical energy storage devices in response to receiving the trigger.

* * * * *